No. 790,907.                                                                                          Patented May 30, 1905.

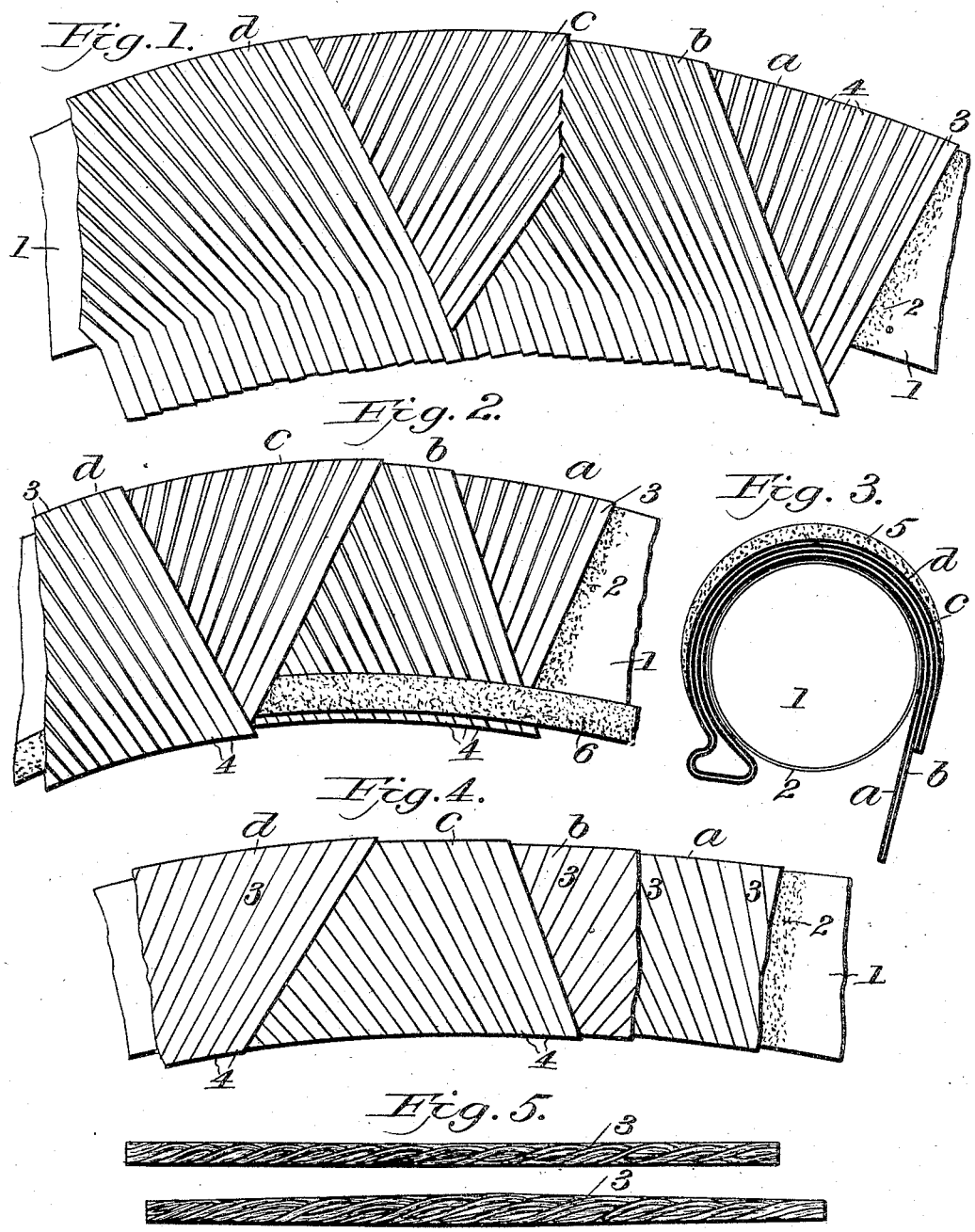

UNITED STATES PATENT OFFICE.

ARTHUR H. MARKS, OF AKRON, OHIO.

METHOD OF CONSTRUCTING TUBULAR FLEXIBLE ARTICLES.

SPECIFICATION forming part of Letters Patent No. 790,907, dated May 30, 1905.

Original application filed September 9, 1904, Serial No. 223,846. Divided and this application filed December 1, 1904. Serial No. 235,121.

*To all whom it may concern:*

Be it known that I, ARTHUR H. MARKS, a citizen of the United States, residing at Akron, in the county of Summit and State of Ohio, have invented certain new and useful Improvements in Methods of Constructing Tubular Flexible Articles, of which the following is a specification.

This invention relates to an improved method of constructing tubular flexible articles designed to withstand internal pressure, such as pneumatic tires, tire-covers, hose, &c.; and the object is to provide a simple and effective method of constructing the same.

With the above object in view the invention consists in the novel features of construction hereinafter fully described, particularly pointed out in the claims, and clearly illustrated by the accompanying drawings, in which—

Figure 1 shows a form upon which the tire is constructed, with several plies of the strips of which the tire is formed being in position thereupon; Fig. 2, a similar view showing the manner of attaching the flanges in the construction of the tire-cover; Fig. 3, a transverse sectional view of Fig. 2; Fig. 4, a view similar to Fig. 1, showing a modified form of the strip of which the tire is formed; and Fig. 5, a detail view of the strips of thread.

I have illustrated in the present application a tire-cover, but do not limit my invention thereto, as it is applicable to tires, hose, and other tubular flexible articles designed to withstand internal pressure, as hereinbefore stated.

Referring now more particularly to the drawings, in the practicing of my improved method a form 1, upon which the tire is to be constructed, is coated with a thin layer 2 of rubber gum, and upon this strips 4 of rubber-coated thread 3 are placed at an angle to form the first ply $a$, Fig. 1. These strips are separated from each other at the outer periphery of the form, but are approximated as they pass therearound, being in contact at the inner periphery of the form. This separation of the strips is necessary when strips of the same width through their entire extent are used, as the inner periphery of the form is of considerably less extent than the outer periphery thereof. As is shown in Fig. 4, the strips could each be formed wide at its center and tapering toward each end, in which event the strips could be placed in contact with each other and at the same time they would be accommodated on the inner periphery of the form. Upon the first ply $a$ of strips 4 a second ply $b$ is formed of similar strips 4, extended about the form in a reverse direction and crossing the strips of ply $a$ at a slightly-increasing angle. Before forming the next layer the first layer may be covered with a thin coating of rubber gum or slushed with rubber cement. Strips 4 are then placed upon ply $b$ at a slightly-increased angle and extending in a reverse direction to form ply $c$ of the second layer. Ply $d$ of the second layer is formed by strips 4 wrapped in a reverse direction to those of ply $c$ and extended at a slightly-increased angle. As many layers may be used as desired, according to the character of the tire or other like article to be constructed. By increasing the angle of crossing of the several plies the elasticity of the plies or layers is varied, the innermost ply or layer having the greatest degree and each ply a smaller degree than its predecessor, so that the entire structure will under pressure stretch uniformly. The structure is then covered with an outer covering of rubber gum 5, and the tire is then vulcanized. The coating of rubber gum 2 is merely to hold the first ply of strips in position.

In building a tire-cover as here illustrated the rubber flanges 6 are placed in position after the first two plies of the strips 4 have been positioned on the form and the ends of the strips of the inner or outermost plies are passed around the outsides of the flanges.

The article constructed in accordance with the herein-described method is claimed in a pending application, Serial No. 223,846, filed September 9, 1904, of which the present application is a division, and in pending applications, Serial No. 200,972, filed March 31, 1904, and Serial Nos. 206,146 and 206,147, filed May 3, 1904.

Having thus fully described my invention, what I claim as new, and desire to secure by Letters Patent of the United States, is—

1. The improved method of constructing a tubular flexible article consisting in placing a plurality of strips of yielding material about a suitable form at an angle to constitute the first layer, placing a second series of strips about the first series at an angle thereto to constitute a second layer and proceeding in like manner until the desired number of layers have been formed, the angle of crossing of the strips of the several layers being varied to produce layers of varying degrees of elasticity, then placing an outside covering of rubber upon the outermost layer of strips, and finally vulcanizing the whole.

2. The improved method of constructing a tubular flexible article consisting in placing successively about a suitable form, a plurality of layers of yielding material having varying degrees of elasticity and arranging the layer having the maximum degree of elasticity innermost and each succeeding layer with a lesser degree of elasticity than its predecessor, then placing an outer covering of rubber upon the outermost layer, and finally vulcanizing the whole.

3. The improved method of constructing a tubular flexible article consisting in placing a plurality of strips about a suitable form to constitute the first layer, placing a second series of strips about the first series to constitute a second layer, and then proceeding in like manner until the desired number of layers have been formed, and placing the strips of each layer in contact at the inner periphery of the form but separated from the adjacent strips of the series at the outer periphery of the form, then placing an outer covering of rubber upon the outermost layer of strips, and finally vulcanizing the whole.

4. The improved method of constructing a tubular flexible article consisting in placing around a suitable form, a plurality of strips formed wide at their centers, and tapering toward their ends, to constitute the first series, placing a second series of said strips upon the first layer to constitute the second layer, proceeding in like manner until the desired number of layers have been formed, then placing an outer covering of rubber about the outermost layer and then vulcanizing the whole.

5. The improved method of forming a tire-cover consisting of placing about a suitable form a series of strips to form the first layer, then placing a second series of strips about the first series to form a second layer, then attaching rubber flanges, then proceeding as first set forth to form successive layers by adding series of strips, and passing the ends of some of said layers of strips around the flanges, then placing a covering of rubber upon the outermost layer of strips, and finally vulcanizing the whole.

In testimony whereof I affix my signature in presence of two witnesses.

ARTHUR H. MARKS.

Witnesses:
O. S. HART,
J. L. MARSHALL.